J. N. LAWRENCE.
BAND BRAKE.
APPLICATION FILED MAR. 15, 1909.
939,519.
Patented Nov. 9, 1909.
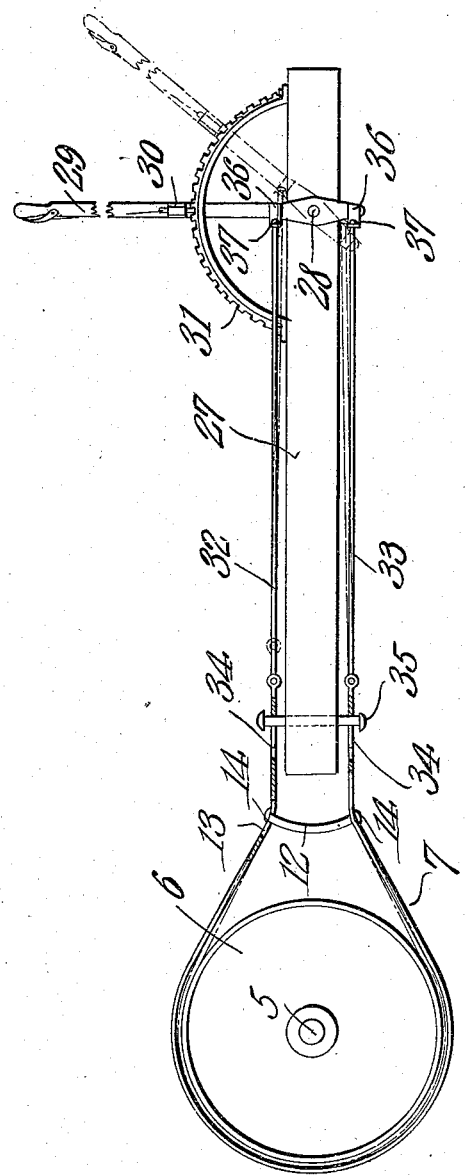
Witnesses
Inventor
John N. Lawrence.
By C. A. Snow & Co.
Attorneys

UNITED STATES PATENT OFFICE.

JOHN N. LAWRENCE, OF NEVADA, MISSOURI.

BAND-BRAKE.

939,519. Specification of Letters Patent. Patented Nov. 9, 1909.

Application filed March 15, 1909. Serial No. 483,464.

*To all whom it may concern:*

Be it known that I, JOHN N. LAWRENCE, a citizen of the United States, residing at Nevada, in the county of Vernon and State of Missouri, have invented a new and useful Band-Brake, of which the following is a specification.

This invention relates to band brakes designed more particularly for use on motor vehicles, for checking the forward, as well as the retrograde movement thereof. It sometimes happens that the motive power of the vehicle gives out in ascending a hill, whereupon the vehicle starts to back down the hill, which is inconvenient, and frequently results in serious accidents. Band brakes, as ordinarily constructed, are frequently unable to check this retrograde movement of the vehicle, and having this deficiency in mind, I have devised the brake which is the subject of the present invention, the same consisting in a novel construction and arrangement of parts, to be hereinafter described and claimed, reference being had to the drawing hereto annexed, in which an elevation of the brake mechanism is shown, partly in section.

Referring more particularly to the drawing, 5 denotes a shaft on which the band wheel 6 is mounted. Around the periphery of the band wheel 6 passes a brake band 7.

At 12, is indicated a stem which passes through slots 13 in the respective ends of the band, said stem having at its outer end pins 14 which serve to draw the two ends of the band together around a considerable portion of the periphery of the band wheel, in order that a large friction surface may be had.

At 27 is indicated a suitable support mounted on a vehicle at any convenient place thereon. To said support is fulcrumed at 28, a hand lever 29 provided with a spring latch 30 engageable with a toothed segment 31 mounted on the support. To this lever are connected rods 32 and 33, which are connected respectively to the two ends of the band 7. The two ends of the band, adjacent to their points of attachment to the rods, are formed with slots 34, through which passes a pin 35 carried by the support 27.

The rods 32 and 33 are connected to the hand lever 29 on opposite sides of its fulcrum 28, said connection being made by means of brackets 36 secured to the hand lever, and having openings through which the rods loosely pass, the ends of the rods being formed with heads 37, whereby they are prevented from being pulled out of the openings. A sliding connection between the rods and the hand lever is thus provided.

The operation of the mechanism is as follows:—Upon swinging the hand lever to the right, a pull on the rod 32 is had, and through the same the upper portion of the band 7 is tightened on the band wheel 6. During this movement of the hand lever the rod 33 remains stationary, it slipping through the opening of its bracket 36. Upon swinging the hand lever to the left, the rod 32 remains stationary, and the rod 33 is moved forwardly, whereby, through its connection with the lower end of the band 7, said end is tightened on the band wheel. The slots 34 are of sufficient length to permit the tightening movement of the band, and the end of one slot engages the pin 35 and serves to hold one end of the band stationary while the other band is being tightened on the band wheel.

It will be seen from the foregoing that I have provided a mechanism which is simple in structure and highly efficient in operation, and by operating the hand lever as described, the rotation of the band wheel is effectually checked, irrespective of the direction of its rotation.

What is claimed is:—

1. The combination with a band brake, the ends of the brake band being slotted, of a support, a hand lever fulcrumed on the support, connections between the hand lever and the ends of the brake band, said connections being made on opposite sides of the fulcrum of the said lever, and a pin projecting from the support and passing through the slots of the brake band.

2. The combination with a band brake, of a support, a hand lever fulcrumed thereon, connections between the hand lever and the ends of the brake band, said connections being located on opposite sides of the fulcrum of the lever, and means for holding one of said connections stationary while the other connection is being operated by the hand lever to apply the brake.

In testimony that I claim the foregoing as my own, I have hereto affixed my signature in the presence of two witnesses.

JOHN N. LAWRENCE.

Witnesses:
  LOYD ANCHORS,
  MAADDY SENEAMGEN.